United States Patent [19]

Lyberg

[11] Patent Number: 5,826,234

[45] Date of Patent: Oct. 20, 1998

[54] DEVICE AND METHOD FOR DUBBING AN AUDIO-VISUAL PRESENTATION WHICH GENERATES SYNTHESIZED SPEECH AND CORRESPONDING FACIAL MOVEMENTS

[75] Inventor: Bertil Lyberg, Vagnharad, Sweden

[73] Assignee: Telia AB, Farsta, Sweden

[21] Appl. No.: 760,811

[22] Filed: Dec. 5, 1996

[30] Foreign Application Priority Data

Dec. 6, 1995 [SE] Sweden .................................. 9504367

[51] Int. Cl.[6] .................................................. G10L 5/00
[52] U.S. Cl. ................................ 704/277; 704/2; 704/270
[58] Field of Search .................................. 704/258, 272, 704/270, 276, 277, 275, 2

[56] References Cited

U.S. PATENT DOCUMENTS

| 5,293,584 | 3/1994 | Brown et al. | 704/277 |
| 5,615,301 | 3/1997 | Rivers | 704/277 |
| 5,657,426 | 8/1997 | Waters et al. | 704/276 |
| 5,687,280 | 11/1997 | Matsui | 704/231 |

OTHER PUBLICATIONS

Aizawa et al. "Model–Based Analysis Synthesis Image Coding (MBASIC) System for a Person's Face", Mar. 1998.
Morishima S, Aizawa K, Harashima H: "An Intelligent Facial Image Coding Driven by Speech and Phoneme"; ICASSP '89, Feb. 1989.
H Choi, S Harashima, "Analysis and Synthesis of Facial Expression in Knowledge–Based Coding of Facial Image Sequences," In International Conference on Acoustics and Signal Processing, pp. 2737–2740, Jul. 1991.

*Primary Examiner*—David R. Hudspeth
*Assistant Examiner*—Harold Zintel
*Attorney, Agent, or Firm*—Oblon, Spivak, McClelland, Maier & Neustadt, P.C.

[57] ABSTRACT

A device and method in which polyphones of speech of a first language is received and stored as well as a movement pattern in a person's face and/or body is registered. The registration of the movement pattern is made by measuring movement at a number of measuring points in the face/body of the speaker, where the measurements are made at the same time that the polyphones are registered. In connection with translation of a person's speech from one language into another, the polyphones and corresponding movement patterns in the face are linked up to a movement model in the face. A picture image of a face of the real person is after that pasted over the model, at which one to the language corresponding movement pattern is obtained. The invention consequently gives the impression that the person really speaks the language in question.

26 Claims, 5 Drawing Sheets

DEVICE AND METHOD FOR DUBBING AN AUDIO-VISUAL PRESENTATION WHICH GENERATES SYNTHESIZED SPEECH AND CORRESPONDING FACIAL MOVEMENTS

BACKGROUND OF THE INVENTION

1. Field of the Invention

The present invention relates to speech synthesis methods and devices that use facial movements and/or body language to assist in synthesizing speech. The present invention is particularly well adapted for use in systems and methods in which speech of a video transmission of a first person is received in a first language and later spoken in a second language by an image of a second speaking person.

2. Discussion of the Background

Conventional systems and methods translate speech from one language to another based solely on acoustic energy (i.e., sounds) developed by a speaker of the first language.

However, a problem with this conventional approach, as identified and addressed by the present invention, is that the meaning of the first spoken language can often be misinterpreted by the listener of the synthesized speech. In some cases, this misinterpretation is attributable to the listener not being provided corresponding visual clues (e.g., facial expressions and body language) often made by a human speaker so as to accurately express the speaker's message.

One conventional system (i.e., as discussed in Swedish patent application Ser. No. 9301596-4, which corresponds with U.S. Pat. No. 5,546,500) describes how lip movements of a speaker in the first language can be used so as to assist in producing understandable speech in a second language. In particular, these conventional systems suggest adapting the lip movements to correspond with the spoken second language.

However, a problem with this conventional approach, as identified and addressed by the present invention, is that, in the absence of a full facial expression and/or body language, speech and lip movements alone do not accurately reflect the true intended meaning of the speaker's spoken words.

SUMMARY OF THE INVENTION

Accordingly, one object of this invention is to provide a novel device and method of synthesizing speech that overcomes the problems of the prior art.

Another object of the present invention is to provide a device and method for translating speech from one language to another, by producing corresponding facial expressions and/or body language that was derived from the speaker of the first language.

Yet another object of the present invention is to present a device and method that adapts the facial movements of a speaker into corresponding facial movements of a second language.

These and other objects of the present invention are provided in a method and device for synthesizing speech in which polyphones (i.e., multiple phonemes, which are basic sound elements), preferably half-syllables, are stored in a storage unit together with signals indicative of facial expressions and/or body language that correspond to the polyphones. The storage of polyphones is preferred (although other quanta of speech elements are suitably stored as well) because the polyphones are combinable building-blocks of which sounds, words, phrases, and sentences (hereinafter referred to as words) are made. When producing words, the present invention associates facial expressions with the words so that the facial expressions may be applied to a picture image of a face (or, for example, a body if body language is used), such as what is available in video teleconferencing and video animation facilities. By applying a movement pattern to the picture image that resembles human movement for similarly spoken words, the resultant picture image resembles a movement of a real human face when expressing the words as intended by the original speaker.

The present invention collects signals indicative of the facial expressions, by monitoring a number of points on a face of an original speaker and storing the collected signals in a "polyphone bank", which is preferably associated with the speaker (although a generic speaker may be used as well). Relative and absolute movement of the number of points on the original speaker's face is referred to as a movement pattern that is associated with the recorded polyphones, and is recognized by humans as facial expressions. Employing this signal collection approach, polyphones for a number of different languages are recorded and registered together with corresponding facial movement patterns. In this way, devices that embody the present invention are capable of synthesizing speech in many languages along with a corresponding visual image of a person who is speaking the second language.

The stored face movement pattern of the original speaker is used for modeling a corresponding facial movement pattern associated with speech synthesized in the second language. The invention in this way gives a set of facial expressions which are associated with the different polyphones. Subsequently, the facial movement pattern is combined with one or more of the polyphones associated corresponding words. In this way a modeled facial expression is achieved, which is applied to a picture image of a speaking person to which the synthesized speech corresponds.

With respect to modeling the picture image of the face, the present invention considers that a polyphone may be associated with given different facial expressions when used in particular sequences. In other words, the present invention is not limited to producing discrete facial expressions on a polyphone-by-polyphone basis, but rather, takes into consideration strings of polyphones such that the enunciation of a current polyphone may be affected by future polyphones that will subsequently by enunciated in vowel and consonant combinations, for example. The resultant images of facial movement are further applied to a model which is subsequently applied to an image of a real face of a speaker or an animated face image. Accordingly, the model may either be a two dimensional model or a three dimensional model. When using the three dimensional model, a model head is preferably utilized as the model. The registered points in a face of the model head is thus registered in three dimensions. When creating the real or animated face image, a reproduction of the real face is applied to the model, which yields a lifelike picture image of the real face and its movement pattern.

The numerous advantages associated with the present invention, as compared with the prior art, will lower the communication barriers that prevent people of different nationalities from communicating with one another. In light of the present invention, the incorporation of facial expressions and/or body language will assist the listener/observer in completely understanding the intended message of the speaker. Consequently, persons involved in international business and governmental affairs that require complete and accurate translation services will benefit from the present invention. In particular, users of inter-country telecommunications facilities (e.g., video telephones) will benefit from the present invention. Similarly, the present invention will promote intra-country communications in cases, for example, where first-generation immigrant children will more readily assimilate into domestic school systems with the assistance of devices incorporating the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
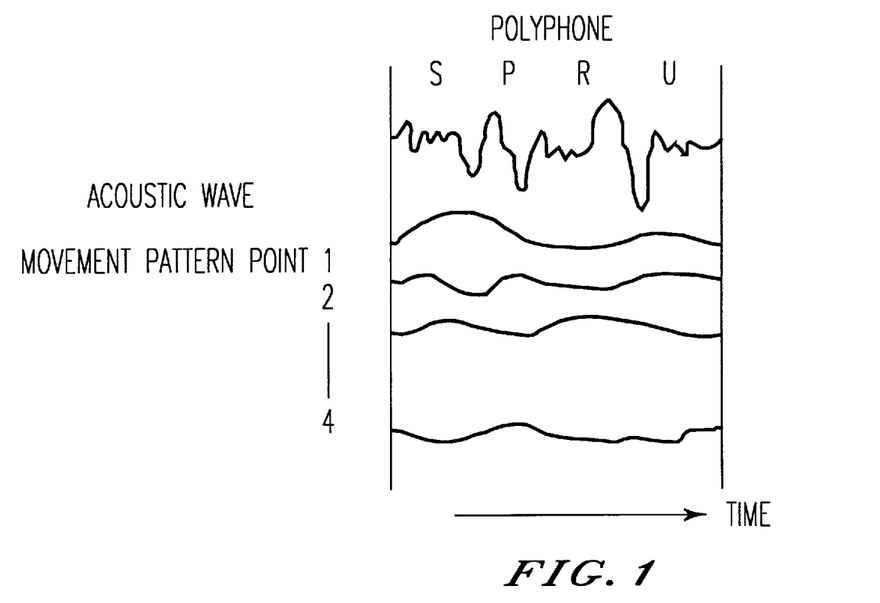
FIG. 1 is an exemplary time-base graph of a polyphone with a corresponding acoustic wave and movement pattern of four signals associated with four points on a speaker's face.

Referring now to the drawings, wherein like reference numerals designate identical or corresponding parts throughout the several views, and more particularly to FIG. 1 thereof, a graph is shown with an acoustic wave and corresponding signals of a movement pattern associated with an original speaker (i.e., a person) pronouncing the polyphone "SPRU". Based on the acoustical wave produced by the original speaker, the acoustic wave is registered and the polyphones comprising the speech are stored in memory look-up table.

In addition to registering the polyphones, a movement pattern of the original speaker's face is registered. The registration of the movement pattern is made by measuring relative and absolute motion of specific points in the original speaker's face which correspond in time to the polyphones spoken by the original speaker. For example, the signal associated with "point 1" in FIG. 1 may correspond with a movement of the original speaker's right eyebrow, and the signals associated with points 2–4 correspond to other portions of the original speaker's face or body. While only four signals associated with four points are shown in FIG. 1, it is to be understood that more or less signals may be used. Furthermore, it is to be understood that the points need not be limited to the speaker's face, but may be positioned at various location about the speaker's entire anatomy.

Figure 2:
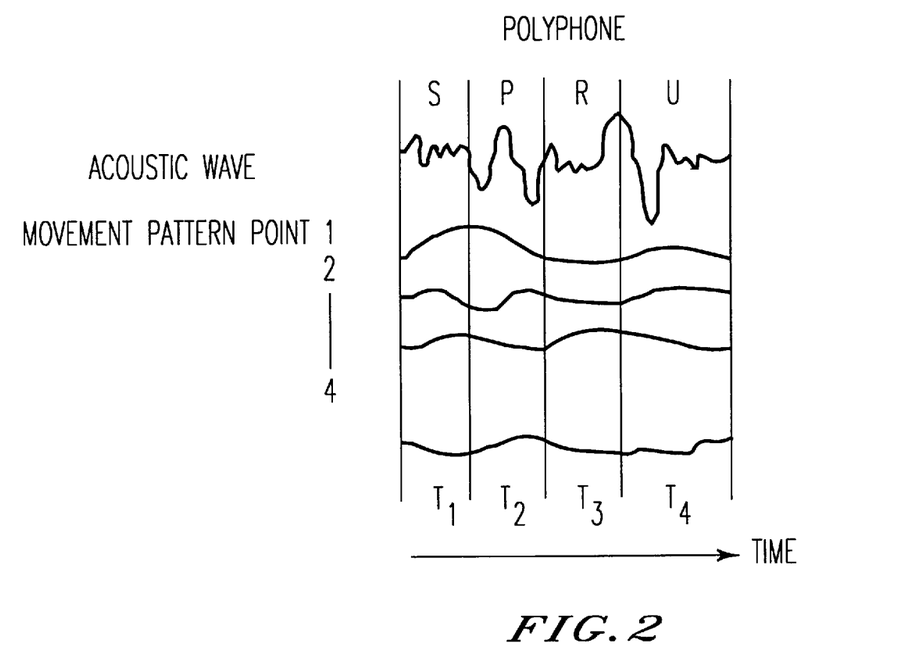
FIG. 2 is the graph of FIG. 1 in which the acoustic wave and four signals are segmented.

FIG. 2 is the same as FIG. 1 although the acoustic wave and four signals of the movement pattern are segmented into segments that correspond with individual phonemes that comprise the polyphone. The segmented signals will be discussed in more detail with respect to FIGS. 3 and 4.

When translating a person's speech from one language into another, the stored polyphones (e.g., "SPRU") and corresponding movements of the face are linked to a movement model of the face. The movement model of the face provides a linkage between the stored signals associated with the points and corresponding movements on, say, the face of a person, such that the magnitudes and variations in the stored signals impart motion at selected locations in the model. Once the model is formed, the face (e.g., the picture image of the face) of the real person is pasted over the model using digital signal processing and graphics processing techniques, such that the movements in the face appear as facial expressions when the polyphones are generated as speech in a second language. The invention consequently gives the impression that the person is actually speaking the second language.

With respect to the recording of polyphones, preferably half syllables of speech, the polyphones are recorded along with corresponding movement patterns associated with movements in the face. Examples of such half-syllable polyphones include "spru", "spri", "kro", etc. When combining polyphones to produce speech, corresponding portions of the facial expressions are produced (albeit adjusted for differences in time duration and intonation based on the translation).

Figure 3:
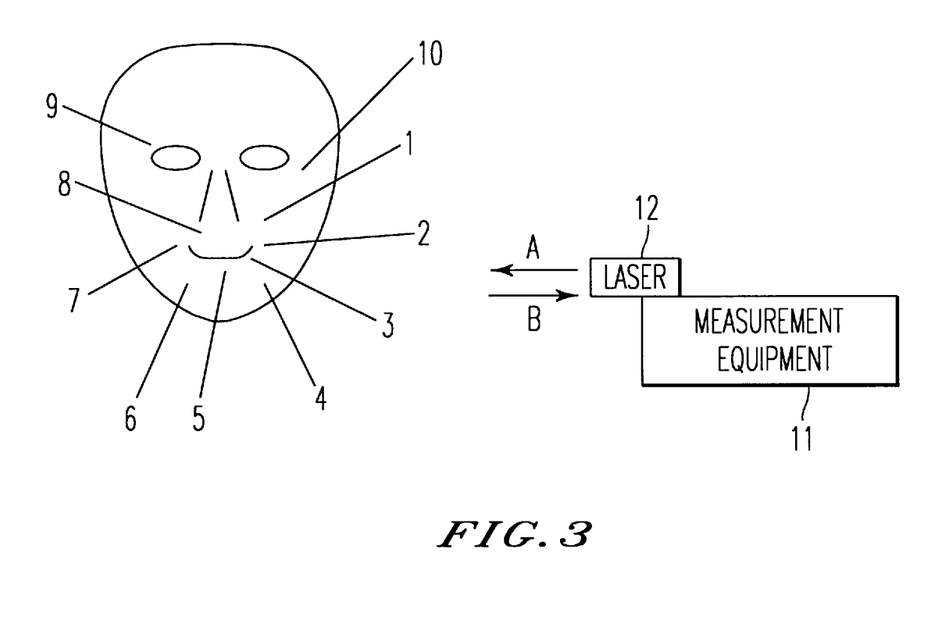
FIG. 3 is a block diagram of a measuring device that is used to collect signals associated with a movement pattern.

When recording the polyphones and face movements, a recording arrangement like that shown in FIG. 3 is used. The arrangement in FIG. 3 allows for simultaneous registration of a number of measuring points (i.e., ten points as shown in FIG. 3, although more or less may be used) in the face of an object of the experiment. The ten measuring points shown in FIG. 3 are labeled as points 1–10. Also included in FIG. 3 a measuring equipment, 11, having a laser, 12, mounted thereon. (For convenience, the measuring equipment 11, will be described herein as both have a measuring equipment function and a video receiver function, although clearly these two function may be separated from one another into separate devices). The laser transmits and scans a light signal, A, under control of the measuring equipment 11, so as to illuminate the respective points 1–10 on the face. Reflected light, B, from the respective points 1–10, is received by a detector in the laser 12, which responds by producing an electrical signal. The electrical signal is then processed in the measuring equipment 11, as will be discussed in more detail with respect to FIG. 4.

In order to facilitate reflection of the transmitted light "A", respective reflectors (e.g., mirrors or the like) are arranged on the subject's face. The measuring equipment, 11, registers the movement pattern in respective measuring points during performance of a natural speech. The speech is associated to the movement pattern in respective measuring points in the face. The number of measuring points in the face depends on to which extent the movement pattern in the face shall be registered. In certain cases it is sufficient to register only the movement pattern around the mouth and the section of the chin. In other applications more complete patterns of movement in the face are desired, for example where one wants to register cheek movements, eye reactions, movements around and on parts of the nose. In other applications, even more complete patterns of movement are desired so as to include the speaker's body language.

As will be described in more detail with respect to FIG. 4, the measurement device 11, is configured to receive audio from the face and divide the audio into half-syllable polyphones. The measurement equipment 11 then links the polyphones to the patterns of movement in the different parts of the face. Both the polyphones and signals associated with the pattern of movement are jointly stored in a database in memory (e.g., semiconductor-based memory or magneticbased memory) directly linking the polyphones and the movement signals corresponding to the registered points in the face. Once assembled, the stored speech and visual data completes one two-dimensional (i.e., audio and visual) language element of a "bank" of languages. The bank also includes other two-dimensional language elements because the movements of a person's face is to some extent depending on which language the person is speaking. For this reason, the polyphones and the face movements are preferably both recorded for each translation language.

Subsequently, the measuring equipment segments each polyphone, as is shown in FIG. 2, so that the respective polyphones can also be transferred to the movement patterns in the face. In this way, the representation of the pronunciation of single letters can be transferred to corresponding movement patterns in the different parts of the face.

One application of the invention is for instance video telephony between parties who speak different languages. In such an application, there is equipments in, or connectable to, the telecommunication network, which register and analyze the speech of the parties (shown in the exemplary embodiment as the measuring equipment 11). The speech is recognized and is translated into the language of the counter party. In connection with the translation to the other language, the sentences which shall be pronounced are produced. The sentences are divided down into polyphones which are fetched from the data base for the language in question. Depending on which words that shall be pronounced, it is possible that some of portions, e.g. phonemes, of the polyphones must be extended or shortened in time. In connection with that, the polyphone is taken out and time-adjusted, also the movement pattern in the different parts of the face is produced. In connection with that, speech synthesis is made and the corresponding movement pattern is also applied to a model of a face.

The model includes of a reproduction of a face which indicates the fundamental features at the utilization of the language in question. During speech synthesis, the picture image of the face of the real person is later pasted over and combined with the model so that the dynamic aspects of the model modify the static aspects of the picture image. The final result is that the facial expressions of carried by the model are imparted to the picture image of the speaker's face.

Figure 4:
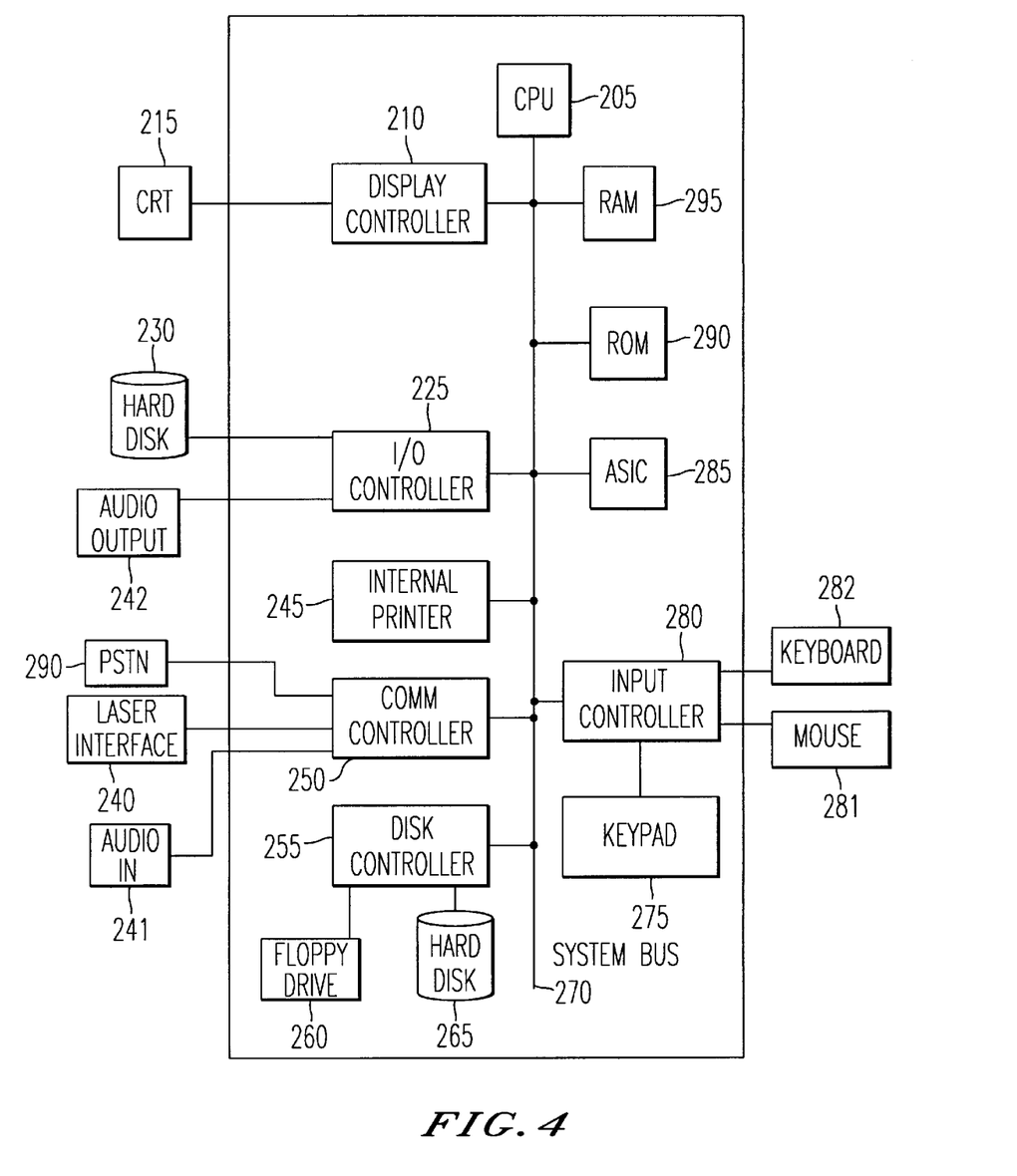
FIG. 4 is a detailed block diagram of a measuring equipment according to the present invention.

FIG. 4 is a block diagram of the measurement equipment 11 according to the present invention. The measurement equipment 11 includes a system bus 270 that interconnects a variety of components that populate the system bus 270. A central processing unit (CPU) 205 is one component that populates the bus and provides general purpose control of the measurement equipment 11 and laser 12, as well as bus administration functions for system bus 270. The CPU 205 has available to it system random access memory (RAM) 295 for temporary storage use and for holding the database with the language banks, non-volatile read only memory (ROM) 290 for program and parameter storage, and an application specific integrated circuit (ASIC) 285 for performing specialized data manipulation. The ASIC 285 could be augmented with other data manipulation devices such as field programmable gate arrays (FPGA, not shown), programmable logic devices (PLDs, not shown) and other processing units (not shown). Also available as system resources are a disk controller 255, which controls an internal floppy drive 260 and a hard disk 265, and an input/output (I/O) controller 225, which controls an external hard disk 230 and an audio output 242 (e.g., a speaker for producing the synthesized speech). The floppy drive 260 may be used by a local user of the measuring apparatus 11 to add a picture file of the user that has not previously been held in memory by the measuring apparatus 11. The hard disk 265 serves as an auxiliary memory device that is equipped to backup the RAM 295.

The measuring equipment 11 also includes an input controller 280 that controls an external keyboard 282, an external mouse 281, and an internal keypad 275 which are used in conjunction with the cathode ray tube CRT 215 to serve as a user interface. A display controller 210 is used to control the CRT display 215 for displaying the final video image of the speaker who makes facial expressions while the translated speech is output through a speaker 242. Other display formats would also be suitable, including plasma displays, active and passive light emitting diode (LED) displays, etc. As previously discussed, the measuring equipment 11 also serves as video telephony receiver, and thus contain more components that is necessary to implement the video telephony receiver. Other devices that only perform the video telephony receiver function require only a subset of the components shown in FIG. 4.

A communications controller 250 also resides on the system bus 270 and connects to the laser interface 240, audio input 241, and public switched telephone network (PSTN, which includes a conventional voice line, an integrated services digital interconnect, ISDN, line, and a high capacity T3 line, for example). The connection to the laser interface 240 is a bi-direction connection so that control signals can be sent to the laser 12 from the CPU 205, and the received reflected light may be passed from the laser 12 to the measuring equipment 11. The audio input 241 includes a microphone which can receive the acoustic signal from the person speaking and provide a corresponding electrical signal to the CPU 205 for processing and subsequent data storage in the RAM 295. The PSTN connection allows the measuring equipment 11 to receive video telephony signals from a remote source. When operated this way, the measuring equipment 11 translates the incoming polyphones and associated measurement patterns into a synthesized speech in a second language along with an associated picture image of the speaker making facial expressions that correspond to the speech.

Figure 5:
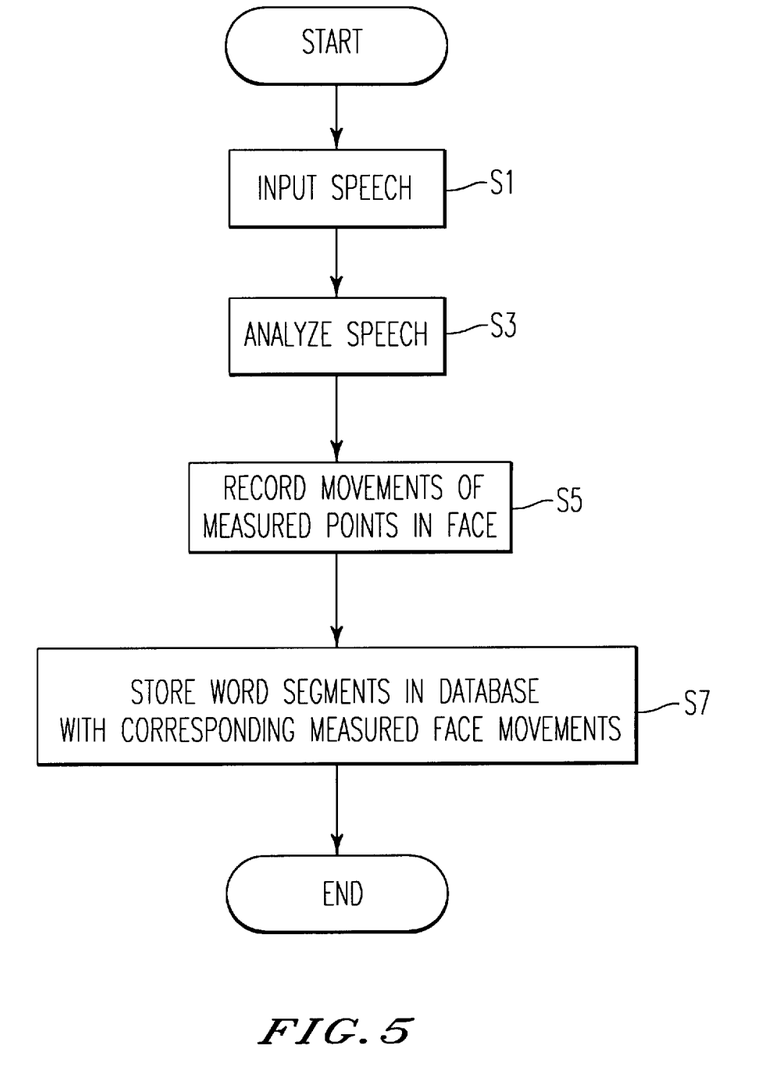
FIG. 5 is a flow chart of a process that stores word segments with facial movements according to the present invention.

FIG. 5 is a flowchart showing a process according to the present invention for recording speech with face movements and registering the same in the database hosted in the RAM 295. The process begins in step S1 where a person whose speech will be translated begins to speak and the person's speech is received through the microphone in the audio input 241. The process then proceeds to step S2 where the audio input 241 provides an electrical signal to the communications controller 250, which digitizes the signal and provides a digital audio signal to the CPU 205. The CPU 205 recognizes this digital signal as being representative of the acoustic wave (FIGS. 1 and 2) and analyzes the digital audio signal by registering the speech into half-syllable polyphones. The process proceeds to step S5 where the laser 12 illuminates the points on the person's face having the reflective material thereon such that the laser light is reflected from the respective points. The laser interface 240 receives the reflected light as separate reflected light signals (e.g., see FIGS. 1 and 2 for point signals 1–4). As discussed with respect to FIGS. 1 and 2, the set of separate reflected light signals constitute the movement pattern of the person's face. The laser interface 240 receives the reflected light signals and passes them to the communications controller 250 which digitizes each signal and passes the set of digitized signals to the CPU 205, thereby completing the measurement of the person's face movements. Alternatively, the CPU 205 could further analyze the face movements by, for example, cataloging the movement pattern by performing pattern recognition processes on the face movement signals. After step S5, the process proceeds to step S7, where the word segments (i.e., half-syllable polyphones in the present embodiment) developed in step S3 are stored in the database in RAM 295 with the face pattern movement signals. The word segments and face pattern movement signals are registered together through their association in a two-dimensional bank. The recording process ends after step S7.

Figure 6:
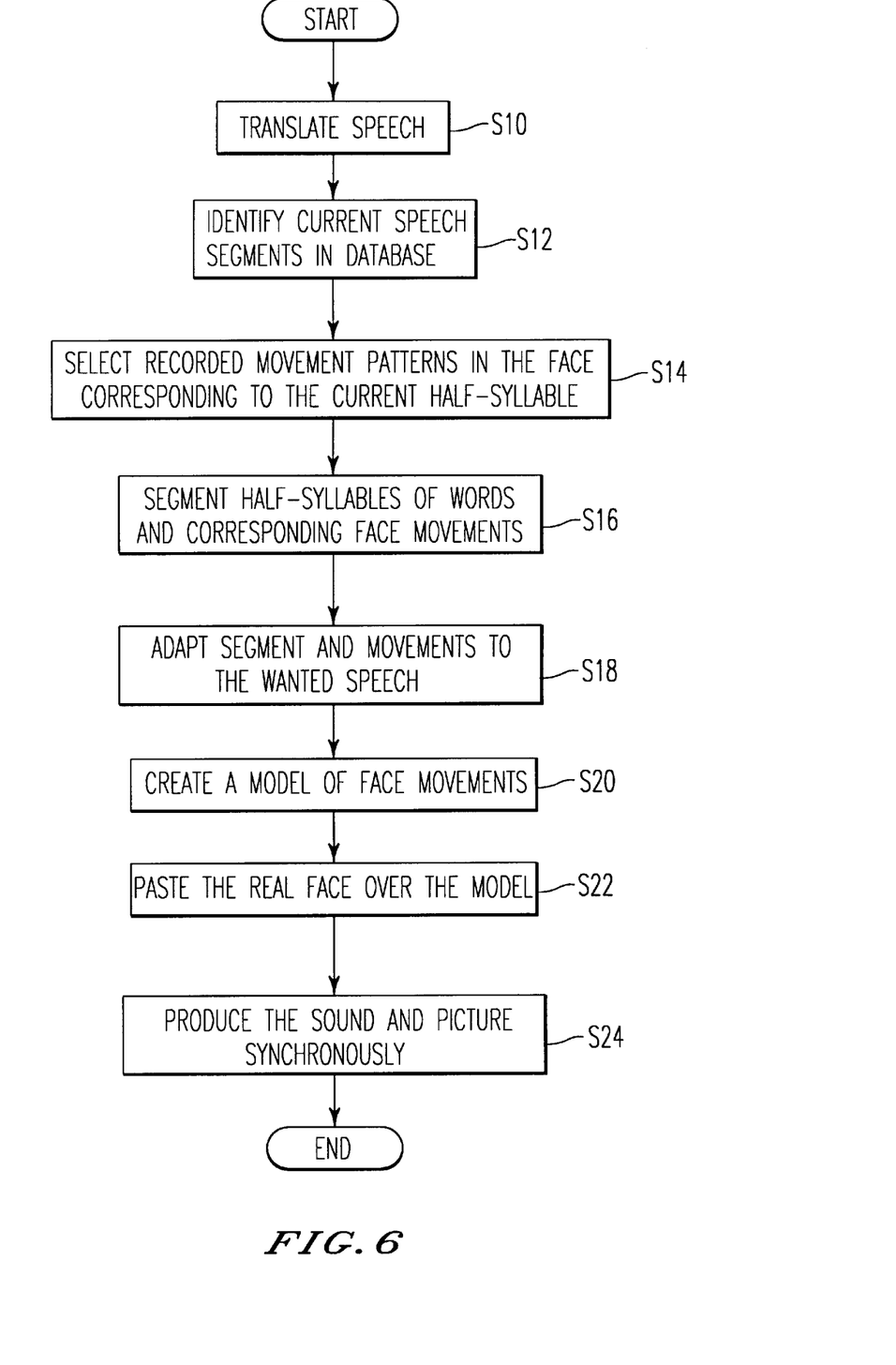
FIG. 6, is a flow chart of a process that uses the stored movement pattern to produce a picture image that provides facial expression along with synthesized translated speech.

FIG. 6 is a flowchart of a translation process according to the present invention. The translation process uses the database of half-syllable polyphones and associated movement pattern signals which were developed in accordance with the process shown in FIG. 5. The translation process beings in step S10 where a person speaks a language which is to be translated into a second language. The speech is translated into a second language in step S10. Then, in Step S12, the half-syllables are sought out in the database stored in the RAM 295. Once the corresponding speech segments are identified in the database, the corresponding movement pattern signals are also identified and retrieved by the CPU 205 as part of the step S14. The process then proceeds to step S16 where the half-syllable polyphones and corresponding movement pattern in the face is segmented (see, FIG. 2). The process then proceeds to step S18 where the segments are combined so as to produce the final translated speech and the facial movements associated with the translated speech are also produced. For instance, in step S18 if the speech segments must be extended or shortened in time corresponding to time dependant variations between the first and second languages, corresponding lengthening/shortening changes are also introduced for corresponding segments in the face movements. When segmentation and adaption has been performed in steps S16 and S18 respectively, the process proceeds to step S20 where a model of the face movements is created of a model head. The model head is a time-based data file associated with an animated graphics display image that indicates which parts of the face move during the execution of the translated speech. The model need not include other features of the a specific person's face which do not change as a function of time. After the model is completed, the process proceeds to step S22 where, in order to create a lifelike reproduction, the image of a real person is combined ("pasted") with the model so that the dynamic features of the model are imparted to the lifelike reproduction of the person's face so as to produce an impression that the person is actually speaking the translated language, and the meaning of the speech is clarified by the facial expressions associated with the spoken words. The reproduction of the person's face is stored in the internal hard disk 265 or external hard disk 230. A new user may insert a floppy disk into the floppy disk 260 so the measurement equipment 11 can reproduce their facial image even though their facial image was not previously recorded. Alternatively, a picture of the person's face may be transferred from the original speaker at the time the speech recording was made. This could be done, for example, with the laser 12, or a digital camera (not shown). In step S22, the model is combined with the lifelike reproduction of the speakers face using image graphics techniques such that the image of the real speaker's face is pasted/superimposed on the model's head. The process then proceeds to step S24 where the sound of the translated speech and the picture of the superimposed face on the model head are synchronously produced on the audio output 242 and CRT 215 respectively. Alternatively, the output may be transferred directly to a video telephone receiver (which can either perform the translation or accept the translated speech) where the image and speech may be produced. Whether generated locally at the CRT 215 or remotely at a video telephone receiver, the end result is that of a reproduction of a speaker's face with the associated speech that will be created for a listener/viewer who will observe the speaker actually speaking in a natural manner.

In what has been described above, video telephony has been used as example, but the invention is applicable to situations where a person plays the part of speaking a different language from which he/she originally has spoken. As previously discussed, the present invention may also be used for dubbing films to provide more realistic behaviors.

The present invention is also applicable for registration of the total movement pattern of a person so as to impart body language (e.g., shrugging shoulders, pointing at items, etc.). In such a connection, the measuring points are applied to a number of measuring points over the whole body of a person. The measuring points are, as has been described above, stored for linking to a translation of a given speech where the movement pattern first is built up on a model, whereupon the picture of the real person is pasted/superimposed thereon.

In another embodiment the invention can be utilized for application of movement patterns on animated films for achieving lifelike movements of, for instance, drawn and data animated figures.

In a further embodiment the measuring points, (e.g., points 1–10 in FIG. 3) in the face, are registered in a three-dimensional way. The stored information is after that utilized to create a three-dimensional model of the movement pattern on a model head. To transfer the obtained movement pattern on a person's head, a reproduction of the person's head is applied to the model by pasting. The pasting implies that the face of the person is made by a three-dimensional picture of the person's face that is produced and superimposed on the model head, at which time the person in question gets a movement pattern which corresponds to the movement pattern of the language.

The invention is not restricted to what is expressly described above, or to the below presented patent claims, but may be subject to modifications within the scope of the teachings of the present invention.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters: Patent of the United States is:

1. A speech synthesis device comprising:
   a speech and visual input device configured to receive speech spoken in a first language by a subject and corresponding facial movement images of said subject:
   a storage unit comprising,
      a polyphone storage section in which plural polyphones of said speech spoken in said first language are stored, and
      a movement pattern storage section in which plural movement signals associated with movement of respective portions of the facial movement images of the subject while producing the plural polyphones are stored and associated with respective of said plural polyphones;

a selection mechanism that selects, based on a word that is to be synthesized in a second language, particular ones of said plural polyphones and corresponding ones of said plural movement signals; and a combination mechanism that combines said particular ones of said plural polyphones to form an output audio signal indicative of said word and used to produce synthesized speech in said second language, and combines said plural movement signals corresponding with said output audio signal so as to form an output visual movement pattern signal that corresponds to the movement of respective portions of the facial movement images of the subject.

2. The device according to claim 1, wherein said movement pattern storage section is configured to register the plural movement signals when the polyphones are stored in the polyphone storage section.

3. The device according to claim 1, wherein:

said speech and visual input device includes a model figure generation mechanism that generates a model of the subject, and wherein said combination mechanism comprises a model combination mechanism that combines said output visual movement pattern signal with the model so as to impart a motion image to said model that corresponds with said movement of respective portions of the facial movement images of the subject.

4. The device according to claim 3, wherein:

said model figure generation mechanism is configured to generate the model as a facial expression model; and said model combination mechanism is configured to apply said facial expression model to an image of a face of the subject.

5. The device according to claim 1, further comprising a registration device connected to said storage unit that registers the plural movement signals from corresponding plural measurement points of a face of a real subject, wherein said movement pattern storage section is configured to register the plural movement signals when the polyphones are stored in the polyphone storage section.

6. The device according to claim 4, wherein when said combination mechanism combines said particular ones of said plural polyphones, the model figure generation mechanism is configured to use corresponding facial expressions of the subject to generate the facial expression model.

7. The device according to claim 5, further comprising:

a facial expression generation mechanism that generates a model of movement in a face of the subject based on the plural movement signals, wherein said combination mechanism comprises a model combination mechanism that combines said output visual movement pattern signal with the model so as to impart a motion image to said model that corresponds with said movement of respective portions of the face of the subject.

8. The device according to claim 7, further comprising:

a translation mechanism that translates the speech in the first language spoken by the subject into a synthesized speech in the second language, wherein, said combination mechanism is configured to combine an image of the face of the subject to the model so as to provide an image of the face of subject with facial expressions expressed thereon that correspond in time to said synthesized speech in the second language.

9. The device according to claim 1, wherein said movement pattern storage section is configured to store three dimensional signals as said plural movement signals associated with a movement of a face of the subject.

10. The device according to claim 9, further comprising a three-dimensional model of the face of the subject, wherein said combination mechanism is configured to combine said plural face movement signals with the three-dimensional model of the face of the subject.

11. The device according to claim 10, wherein said three-dimensional model of the face of the subject comprises a model head.

12. The device according to claim 11, wherein the combination mechanism is configured to combine the three-dimensional model of the face with the plural face movement signals so as to produce an animated model of the face of the subject.

13. The device according to claim 12, wherein the combination mechanism is configured to produce the animated model of the face of the subject either as a two-dimensional image or as a three dimensional image.

14. The device according to claim 1, further comprising a transfer mechanism that transfers the plural movement signals into moving picture images that correspond in time with a synthesized speech that is synthesized based on the output audio signal.

15. The device according to claim 14, wherein said transfer mechanism is configured to transfer the plural movement signals into moving picture images of at least one of an animal, a person, or an illustrated figure.

16. The device according to claim 14, wherein said transfer mechanism is configured to transfer the plural movement signals into moving picture images of facial expressions of animated figures in an animated film.

17. The device according to claim 1, wherein said polyphone storage section is configured to store portions of each of said plural polyphones with corresponding signals associated with a movement pattern of a face of the subject.

18. The device according to claim 17, wherein said combination mechanism is configured to adapt respective of the portions of each of said plural polyphones and configured to similarly adapt said output visual movement pattern signal so as to produce a synthesized speech signal and the output visual movement pattern signal that corresponds to an adapted movement pattern of the face of the subject.

19. The device according to claim 18, wherein the combination mechanism is configured to modify the portions of each of said plural polyphones and configured to similarly modify each of the plural movement signals affected by the portions of plural polyphones modified by the combination mechanism.

20. The speech synthesis device of claim 1, further comprising:

a laser that illuminates points on a face of the subject; and a light receiver that is configured to provide the plural movement signals based on reflected light from the points of the face of the subject illuminated by the laser.

21. A speech synthesis device comprising:

means for receiving speech spoken in a first language by a subject and means for receiving corresponding facial movement images of said subject:

a storage unit comprising, a polyphone storage means for storing plural polyphones of speech that are spoken in said first language by said subject, movement pattern storage means for storing plural movement signals associated with movement of respective portions of the facial movement images of the subject while producing the plural polyphones, and association means for associating the plural movement signals with respective of said plural polyphones;

selection means for selecting, based on a word that is to be synthesized in a second language, particular ones of said plural polyphones and corresponding ones of said plural movement signals; and combination means for combining said particular ones of said plural polyphones to form an output audio signal indicative of said word and to produce synthesized speech in said second language, and for combining said plural movement signals corresponding with said output audio signal so as to form an output visual movement pattern signal that corresponds to the movement of respective portions of the facial movement images of the subject.

22. A method for synthesizing speech, comprising the steps of:

receiving speech spoken in a first language by a subject and corresponding facial movement images of said subject;

storing plural polyphones of speech in the first language that are spoken by the subject;

storing plural movement signals associated with movement of respective portions of the facial movement images of the subject while producing the plural polyphones;

associating the plural movement signals with respective of said plural polyphones;

selecting, based on a word that is to be synthesized in a second language, particular ones of said plural polyphones and corresponding ones of said plural movement signals;

combining particular ones of said plural polyphones, comprising forming an output audio signal indicative of said word in said second language;

combining said plural movement signals, comprising forming an output visual moment pattern signal that corresponds to the movement of respective portions of the facial movement images of the subject; and producing a synthesized speech in the second language from the output audio signal.

23. The method according to claim 22, wherein:

said step of storing plural movements comprises storing signals indicative of plural facial movements of a face of the subject corresponding to respective of a number of points in the face of the subject; and said associating step comprises registering said signals indicative of plural facial movements with respective of the plural polyphones.

24. The method according to claim 23, further comprising the steps of:

producing a model of said face of the subject based on said corresponding ones of said plural movement signals; and applying said model of said face to a reproduction image of the face of the subject.

25. The method according to claim 23, wherein:

said step of storing signals indicative of plural facial movements comprises measuring a movement of plural measuring points on the face of the subject that correspond in time with the polyphones associated with the plural movements signals in said associating step; and said combining step comprises using the polyphones and the plural movement signals to create a movement model of the movement of respective portions of the figure of the subject.

26. The method according to claim 22, further comprising the step of displaying a picture image of the facial movement images of the subject which moves in accordance with the output visual movement pattern.

* * * * *